US012566827B2

(12) United States Patent
Wang

(10) Patent No.: US 12,566,827 B2
(45) Date of Patent: Mar. 3, 2026

(54) METHOD AND APPARATUS FOR DATA PROCESSING BASED ON INTERNET OF THINGS

(71) Applicant: Hangzhou AliCloud Feitian Information Technology Co., Ltd., Hangzhou City (CN)

(72) Inventor: Xuesong Wang, Shanghai (CN)

(73) Assignee: Hangzhou AliCloud Feitian Information Technology Co., Ltd., Hangzhou City (CN)

( * ) Notice: Subject to any disclaimer, the term of this patent is extended or adjusted under 35 U.S.C. 154(b) by 0 days.

(21) Appl. No.: 18/694,367

(22) PCT Filed: Feb. 2, 2023

(86) PCT No.: PCT/CN2023/074193
§ 371 (c)(1),
(2) Date: Mar. 21, 2024

(87) PCT Pub. No.: WO2023/151504
PCT Pub. Date: Aug. 17, 2023

(65) Prior Publication Data
US 2025/0077630 A1 Mar. 6, 2025

(30) Foreign Application Priority Data
Feb. 11, 2022 (CN) .......................... 202210129419.1

(51) Int. Cl.
G06F 21/10 (2013.01)
H04L 9/32 (2006.01)

(52) U.S. Cl.
CPC .............. G06F 21/108 (2023.08); H04L 9/32 (2013.01)

(58) Field of Classification Search
CPC . G06F 21/108; H04L 9/32; H04L 9/40; H04L 63/10; H04L 9/0861; H04L 9/0863;
(Continued)

(56) References Cited

U.S. PATENT DOCUMENTS 12,245,032 B2 * 3/2025 Zheng ................... H04W 12/06
2016/0364553 A1 12/2016 Smith et al.
(Continued)

FOREIGN PATENT DOCUMENTS

CN 102142974 A 8/2011
CN 105162772 A 12/2015
(Continued)

OTHER PUBLICATIONS

Notice of Allowance received in Chinese Application No. 202210129419.1, dated Apr. 17, 2025.
(Continued)

*Primary Examiner* — Abiy Getachew
(74) *Attorney, Agent, or Firm* — Maschoff Brennan

(57) ABSTRACT

Embodiments of the present application provide a method and an apparatus for data processing based on Internet of Things, and the method includes that an Internet of Things platform: receives an authorization request message sent by an Internet of Things device, where the Internet of Things device is deployed with encrypted target content, and the authorization request message carries a device identification and an authentication code of the Internet of Things device; performs verification on the Internet of Things device according to the device identification and the authentication code, and generates a first authorization license for the Internet of Things device after the verification of the Internet of Things device is passed; sends the first authorization license to the Internet of Things device to enable the Internet of Things device to adopt the first authorization license to
(Continued)

decrypt the encrypted target content and use decrypted target content.

20 Claims, 5 Drawing Sheets

(58) Field of Classification Search
CPC ... H04L 9/0869; H04L 63/0428; H04L 63/06; H04L 63/0876; H04L 67/12
See application file for complete search history.

(56) References Cited

U.S. PATENT DOCUMENTS

| | | | |
|---|---|---|---|
| 2018/0218466 A1 | 8/2018 | Mowatt et al. | |
| 2019/0289006 A1* | 9/2019 | Fang | H04W 4/70 |
| 2021/0203491 A1* | 7/2021 | Wei | H04W 12/043 |
| 2023/0229743 A1* | 7/2023 | Diehl | H04L 9/0869 |
| | | | 713/193 |

FOREIGN PATENT DOCUMENTS

| | | |
|---|---|---|
| CN | 105827573 A | 8/2016 |
| CN | 108156126 A | 6/2018 |
| CN | 108512870 A | 9/2018 |
| CN | 110677410 A | 1/2020 |
| CN | 111586125 A | 8/2020 |
| CN | 112333199 A | 2/2021 |
| CN | 113904847 A | 1/2022 |
| CN | 114598501 A | 6/2022 |
| KR | 20200075099 A | 6/2020 |

OTHER PUBLICATIONS

Haibo et al., "Authentication And Authorization Scheme for the Internet of Things Based on Smart Contract", Computer Applications and Software, dated Jan. 2020, vol. 37, No. 1, China.
First Office Action issued Jun. 26, 2024, in Chinese Application No. 2022101294191.
China National Intellectual Property Adminstration; International Search Report and Written Opinion issued in PCT App. No. PCT/CN2023/074193 dated Mar. 23, 2023; 15 pages.
Perspecta Labs et al., "MPS for text messaging from an IoT device"; 3GPP TSG-SA WG1 Meeting #85 S1-190082; Feb. 22, 2019 (Feb. 22, 2019).

* cited by examiner

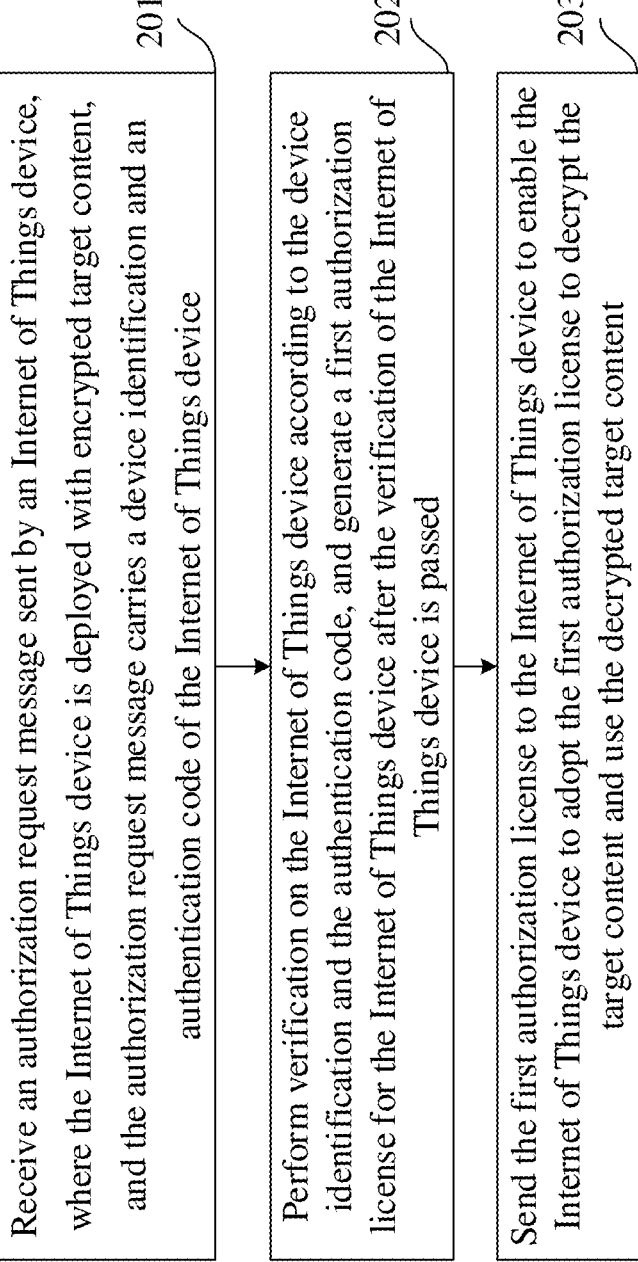

Receive an authorization request message sent by an Internet of Things device, where the Internet of Things device is deployed with encrypted target content, and the authorization request message carries a device identification and an authentication code of the Internet of Things device

201

Perform verification on the Internet of Things device according to the device identification and the authentication code, and generate a first authorization license for the Internet of Things device after the verification of the Internet of Things device is passed

202

Send the first authorization license to the Internet of Things device to enable the Internet of Things device to adopt the first authorization license to decrypt the target content and use the decrypted target content

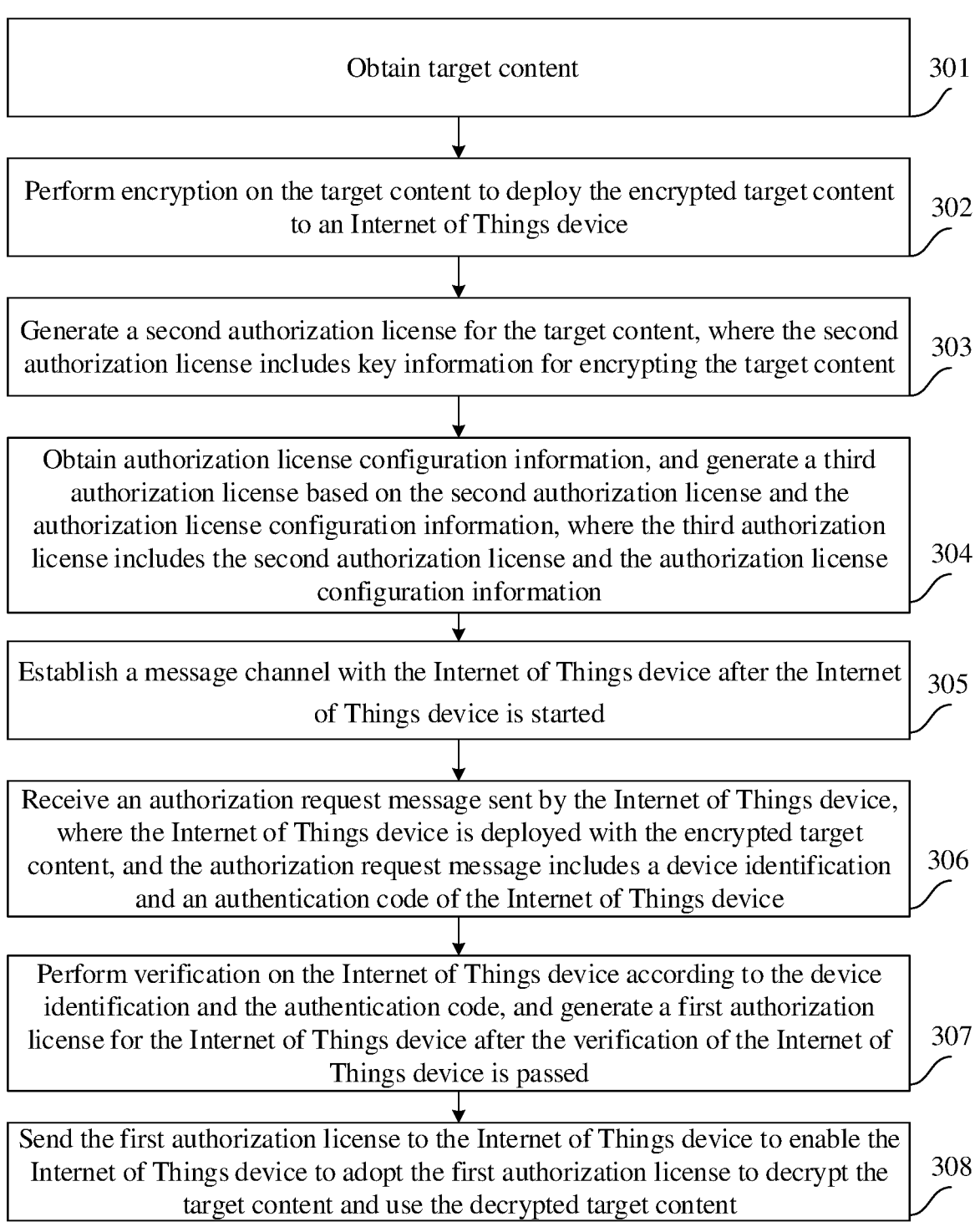

| Obtain target content | 301 |

| Perform encryption on the target content to deploy the encrypted target content to an Internet of Things device | 302 |

| Generate a second authorization license for the target content, where the second authorization license includes key information for encrypting the target content | 303 |

| Obtain authorization license configuration information, and generate a third authorization license based on the second authorization license and the authorization license configuration information, where the third authorization license includes the second authorization license and the authorization license configuration information | 304 |

| Establish a message channel with the Internet of Things device after the Internet of Things device is started | 305 |

| Receive an authorization request message sent by the Internet of Things device, where the Internet of Things device is deployed with the encrypted target content, and the authorization request message includes a device identification and an authentication code of the Internet of Things device | 306 |

| Perform verification on the Internet of Things device according to the device identification and the authentication code, and generate a first authorization license for the Internet of Things device after the verification of the Internet of Things device is passed | 307 |

| Send the first authorization license to the Internet of Things device to enable the Internet of Things device to adopt the first authorization license to decrypt the target content and use the decrypted target content | 308 |

FIG. 3

| |
|---|
| Send an authorization request message to an Internet of Things platform when a use of the encrypted target content is triggered, where the authorization request message carries a device identification and an authentication code of the Internet of Things device |

401

| |
|---|
| Receive a first authorization license sent by the Internet of Things platform, and adopt the first authorization license to decrypt the target content and use the decrypted target content, where the first authorization license is generated for the Internet of Things device after the Internet of Things platform performs verification on the Internet of Things device according to the device identification and the authorization code and the verification of the Internet of Things device is passed |

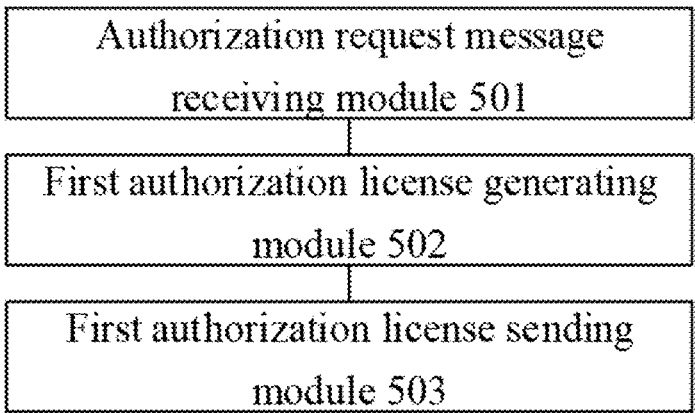

FIG. 5

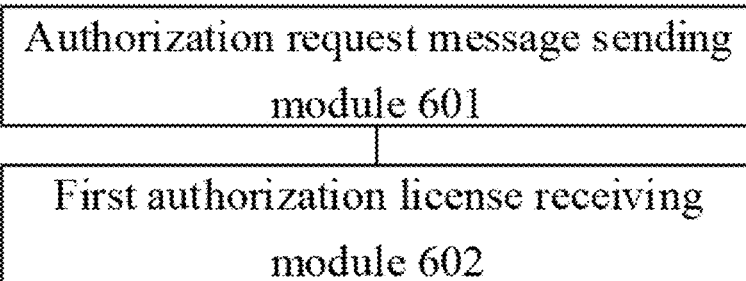

FIG. 6

METHOD AND APPARATUS FOR DATA PROCESSING BASED ON INTERNET OF THINGS

CROSS-REFERENCE TO RELATED APPLICATIONS

The present application is a National Stage of International Application No. PCT/CN2023/074193, filed on Feb. 2, 2023, which claims priority to Chinese Patent Application No. 202210129419.1, entitled "METHOD AND APPARATUS FOR DATA PROCESSING BASED ON INTERNET OF THINGS", and filed with the China National Intellectual Property Administration on Feb. 11, 2022. These applications are hereby incorporated by reference in their entireties.

TECHNICAL FIELD

The present application relates to the field of the Internet of Things technologies and, in particular, to a method and an apparatus for data processing based on the Internet of Things.

BACKGROUND

Nowadays, in order to ensure real-time data processing and data privacy, more and more core technologies will be integrated into Internet of Things (IoT) devices. Due to the core technologies being integrated into IoT devices, it is necessary to ensure the security of, and manage and control the use of core technologies, for example manage and control the effective time allowed to be used, in order to prevent illegal theft and leakage.

However, in the field of the Internet of Things, some Internet of Things devices are unable to execute complex calculations and human-computer interaction due to limited resources and computing power. Moreover, transmission of low-speed networks where some Internet of Things devices are located is of poor real-time performance and even unavailable. These reasons make it difficult to ensure the security of, manage and control the use of core technologies integrated in the Internet of Things devices.

SUMMARY

In view of the problems mentioned above, a method and an apparatus for data processing based on Internet of Things are proposed to overcome or at least partially solve the problems, which include the follows.

A method for data processing based on Internet of Things is provided, which is applied to an Internet of Things platform and includes:

receiving an authorization request message sent by an Internet of Things device, where the Internet of Things device is deployed with encrypted target content, and the authorization request message carries a device identification and an authentication code of the Internet of Things device;

performing verification on the Internet of Things device according to the device identification and the authentication code, and generating a first authorization license for the Internet of Things device after the verification of the Internet of Things device is passed;

sending the first authorization license to the Internet of Things device to enable the Internet of Things device to adopt the first authorization license to decrypt the encrypted target content and use the decrypted target content.

In an implementation, before generating the first authorization license for the Internet of Things device, the method further includes:

generating a second authorization license for original target content, where the second authorization license includes key information for encrypting the original target content;

obtaining authorization license configuration information, and generating a third authorization license based on the second authorization license and the authorization license configuration information: where the third authorization license includes the second authorization license and the authorization license configuration information;

where the generating the first authorization license for the Internet of Things device includes:

generating the first authorization license for the Internet of Things device according to the third authorization license.

In an implementation, before generating the second authorization license for the original target content, the method further includes:

obtaining the original target content;

performing encryption on the original target content, and deploying the encrypted target content to the Internet of Things device.

In an implementation, the authorization license configuration information includes:

information on the number of devices of authorization license, and information on an effective duration of authorization license.

In an implementation, before receiving the authorization request message sent by the Internet of Things device, the method further includes:

establishing a message channel with the Internet of Things device after the Internet of Things device is started.

In an implementation, the authentication code is one-off authentication data generated based on an authentication key or a device root-of-trust of the Internet of Things device, and the Internet of Things device performs an authentication code generation every time the Internet of Things device uses the authentication code for authentication.

A method for data processing based on Internet of Things is provided, which is applied to an Internet of Things device, where the Internet of Things device is deployed with encrypted target content, and the method includes:

sending an authorization request message to an Internet of Things platform when a use of the encrypted target content is triggered, where the authorization request message carries a device identification and an authentication code of the Internet of Things device;

receiving a first authorization license sent by the Internet of Things platform, and adopting the first authorization license to decrypt the encrypted target content and use decrypted target content: where the first authorization license is generated for the Internet of Things device after the Internet of Things platform performs verification on the Internet of Things device according to the device identification and the authorization code and the verification of the Internet of Things device is passed.

In an implementation, the method further includes:

storing the first authorization license locally and binding the first authorization license to the Internet of Things device.

In an implementation, an abnormal condition occurring during a loading or verifying process includes any of the following:

there is no authorization license for the encrypted target content locally stored on the Internet of Things device, or an authorization license for the encrypted target content stored locally on the Internet of Things device is invalid.

In an implementation, the sending the authorization request message to the Internet of Things platform when the use of the encrypted target content is triggered includes:

loading and verifying an authorization license for the encrypted target content when the use of the encrypted target content is triggered, and sending the authorization request message to the Internet of Things platform when an abnormal condition occurs during the loading or verifying process.

In an implementation, the authentication code is one-off authentication data generated based on an authentication key or a device root-of-trust of the Internet of Things device, and the Internet of Things device performs an authentication code generation every time the Internet of Things device uses the authentication code for authentication.

An apparatus for data processing based on Internet of Things, applied to an Internet of Things platform, includes:

an authorization request message receiving module, configured to receive an authorization request message sent by an Internet of Things device, where the Internet of Things device is deployed with encrypted target content, and the authorization request message includes a device identification and an authentication code of the Internet of Things device;

a first authorization license generating module, configured to perform verification on the Internet of Things device according to the device identification and the authentication code, and generate a first authorization license for the Internet of Things device after the verification of the Internet of Things device is passed;

a first authorization license sending module, configured to send the first authorization license to the Internet of Things device to enable the Internet of Things device to adopt the first authorization license to decrypt the encrypted target content and use decrypted target content.

An apparatus for data processing based on Internet of Things is provided, which is applied to an Internet of Things device, where the Internet of Things device is deployed with encrypted target content, and the apparatus includes:

an authorization request message sending module, configured to send an authorization request message to an Internet of Things platform when a use of the encrypted target content is triggered, where the authorization request message includes a device identification and an authentication code of the Internet of Things device;

a first authorization license receiving module, configured to receive a first authorization license sent by the Internet of Things platform, and adopt the first authorization license to decrypt the encrypted target content and use decrypted target content: where the first authorization license is generated for the Internet of Things device after the Internet of Things platform performs verification on the Internet of Things device according to the device identification and the authorization code and the verification of the Internet of Things device is passed.

The embodiments of the present application have the following advantages:

in the embodiments of the present application, an Internet of Things platform receives an authorization request message sent by an Internet of Things device, where the Internet of Things device is deployed with encrypted target content, and the authorization request message carries a device identification and an authentication code of the Internet of Things device: then the Internet of Things platform performs verification on the Internet of Things device according to the device identification and the authentication code, generates a first authorization license for the Internet of Things device after the verification of the Internet of Things device is passed, and sends the first authorization license to the Internet of Things device to enable the Internet of Things device to adopt the first authorization license to decrypt the encrypted target content and use the decrypted target content. In this way, the lightweight authorization management and content protection of the IoT device is realized, not only automatic authorization management can be performed on the IoT device, but also the performance loss of the IoT device and the impact of the network in which the IoT device is located can be reduced through protecting the security of content by encryption means.

BRIEF DESCRIPTION OF DRAWINGS

In order to illustrate the technical solutions of the present application more clearly, the drawings required for the description of the present application will be briefly introduced below. Obviously, the drawings in the following description are merely intended for some embodiments of the present application; and for those of ordinary skill in the art, other drawings can be obtained according to these drawings without making creative efforts.

FIG. 2 is a flowchart of steps of a method for data processing based on Internet of Things provided by an embodiment of the present application:

FIG. 3 is a flowchart of steps of another method for data processing based on Internet of Things provided by an embodiment of the present application:

FIG. 4 is a flowchart of steps of another method for data processing based on Internet of Things provided by an embodiment of the present application:

FIG. 5 is a structural block diagram of an apparatus for data processing based on Internet of Things provided by an embodiment of the present application; and FIG. 6 is a structural block diagram of another apparatus for data processing based on Internet of Things provided by an embodiment of the present application.

DESCRIPTION OF EMBODIMENTS

In order to make the above purposes, technical solutions, and advantages of the present application clearer, the present application will be further illustrated in detail below in conjunction with the drawings and description of embodiments. Obviously, the described embodiments are part of the embodiments of the present application, rather than all of the embodiments. Based on the embodiments in the present application, all other embodiments obtained by those of ordinary skill in the art without making creative work shall fall within the protection scope of the present application.

In the field of the Internet of Things, hardware encryption locks or software registration codes can be used to ensure the security of core technologies and algorithms and manage and control their use, but both of them have certain limitations.

The way by using the hardware encryption lock is to manage the authorization of software through the hardware encryption lock, to prevent unauthorized use or resist piracy threats, and to protect source codes and algorithms, but has the following shortcomings:

1, this way is suitable for traditional one-off permanent authorization, and cannot facilitate to realization of a trial version and on-demand use;

2, separate peripheral hardware needs to be added, which increases usage and maintenance costs; and 3, this way is not suitable for fragmented scenarios of the Internet of Things devices, for which unified hardware interfaces cannot be achieved.

The way by using the software registration code is to use a unique serial number of device hardware as a registration source and generate a registration code through an algorithm in combination with product information and usage restrictions, to ensure the software against theft, but has the following shortcomings:

1, it is necessary to perform operations such as collecting device hardware information, registering, and activating the registration code, and real-time automatic activation and authorization cannot be achieved;

2, in order to ensure security, the algorithm for generating the registration code is generally more complex and requires higher device performance; and 3, many IoT devices do not provide human-computer interaction interfaces, and the way by using the software registration code is not very universal.

In the embodiments of the present application, the lightweight authorization management and content protection of devices for the Internet of Things is designed, to provide automatic authorization management for massive IoT devices, which protects the security of the content through certain encryption means while reducing performance loss and network influence.

Figure 1A:
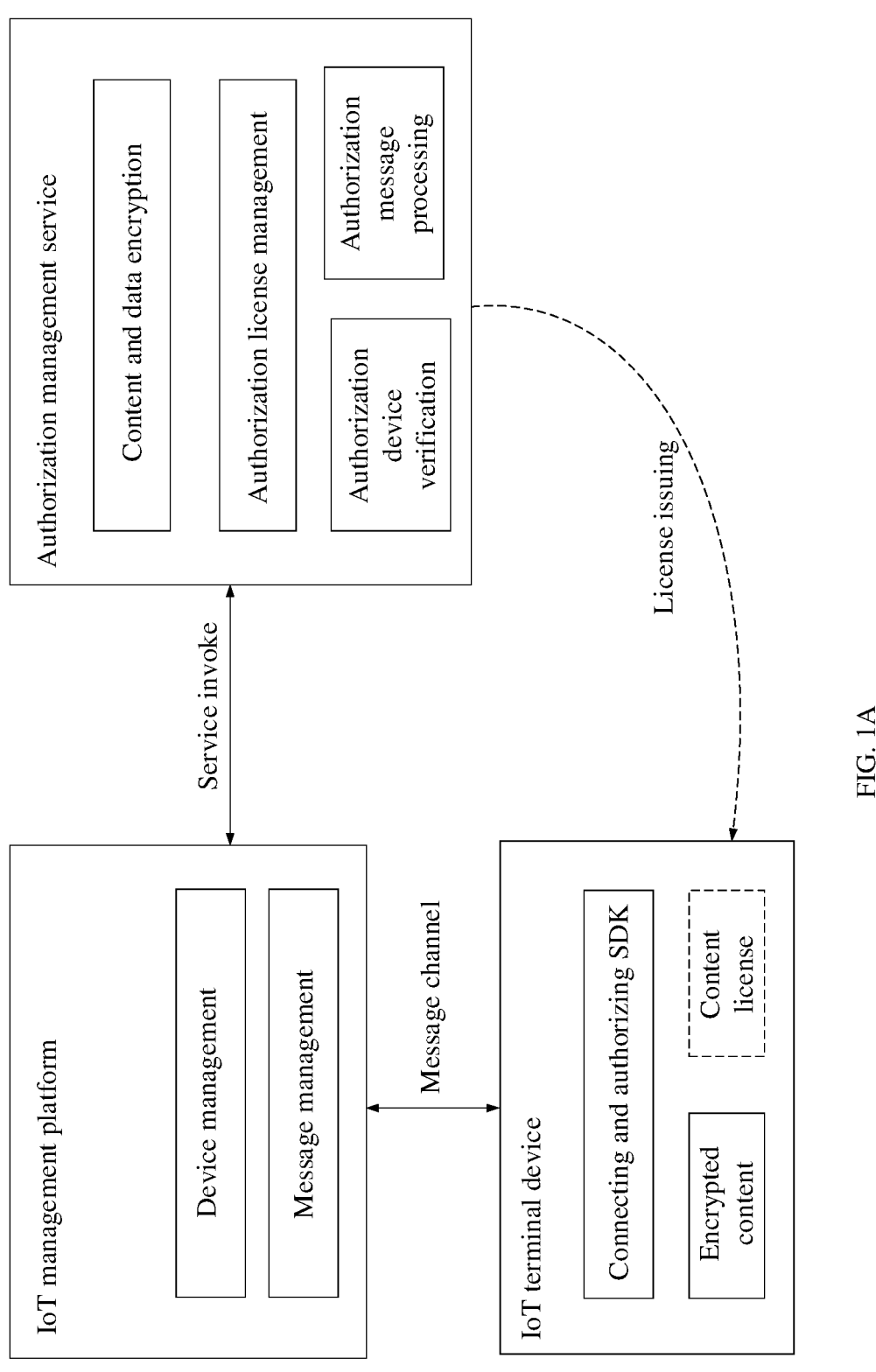
FIG. 1A is a schematic diagram of an Internet of Things system architecture provided by an embodiment of the present application.

As shown in FIG. 1A, an IoT management platform (i.e., an IoT platform) can establish a message channel with an IoT terminal device (i.e., an IoT terminal), and can invoke authorization management services to issue licenses.

The IoT management platform has the following functions:

1, provide content management (encryption, deployment);

2, provide authorization management (license configuration) corresponding to the content; and 3, provide IoT device management and a unified messaging channel between clouds and terminals.

The authorization management service has the following functions:

1, provide basic interfaces for content encryption and license management;

2, provide a processing interface for device authorization messages; and

3, provide integrated security protection (such as device authentication, and message encryption).

The IoT terminal device has the following functions:

1, use content to accomplish specific functional purposes; and 2, carry an authorized SDK (Software Development Kit, Software Development Kit), which is responsible for license application, secure storage, license verification and content decryption.

Figure 1B:
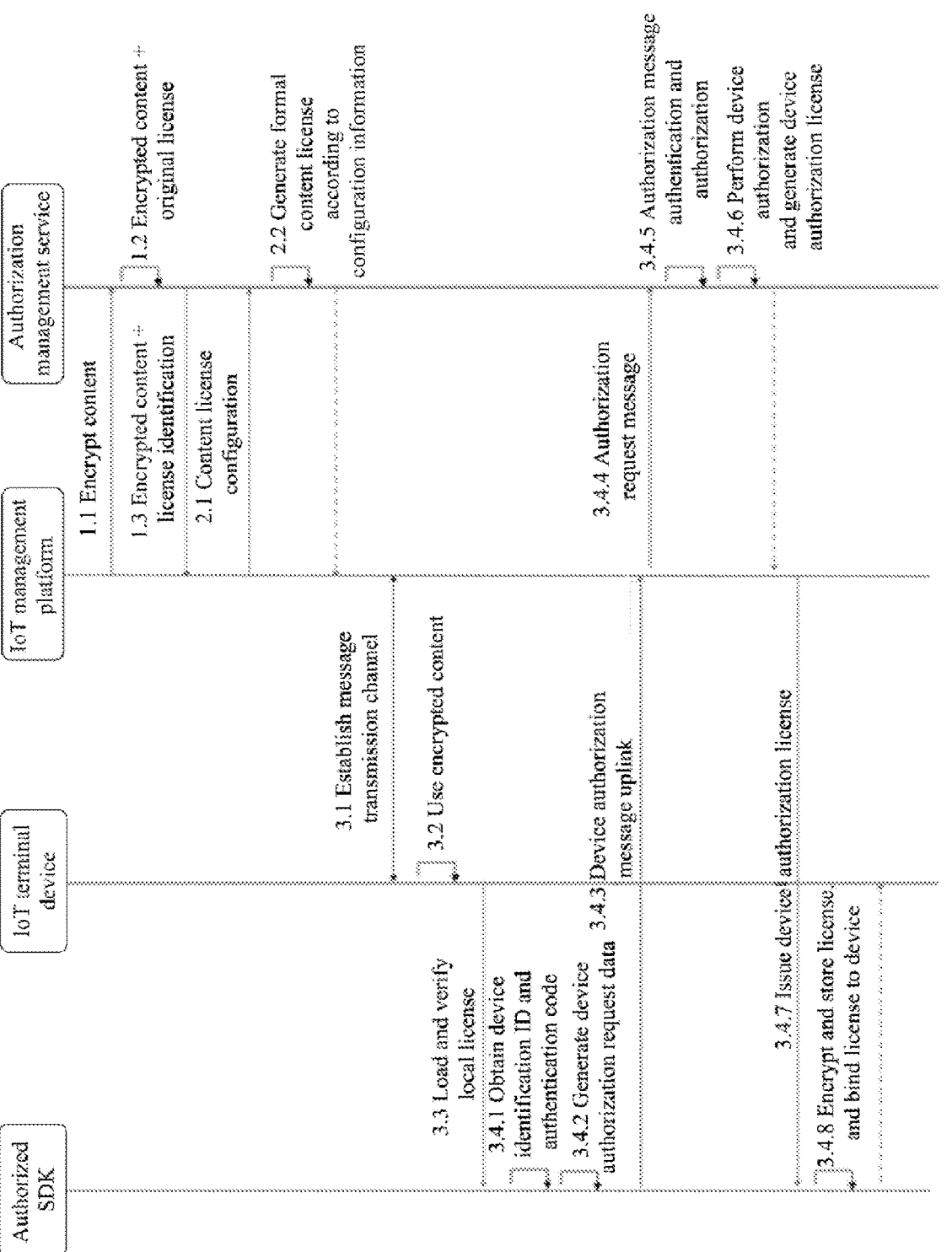
FIG. 1B is a flowchart of steps of an authorization license example provided by an embodiment of the present application.

As shown in FIG. 1B, the specific steps of an authorization license example may include:

1.1, the IoT management platform invokes an encrypted interface of the authorization management service;

1.2, the authorization management service completes the encryption of original content (i.e., target content) while generating a corresponding original license file (i.e., a second authorization license);

1.3, the authorization management service sends the encrypted content and a license identification of the original license file to the IoT management platform;

2.1, the IoT management platform invokes the authorization management service to perform content license configuration;

2.2, the authorization management service generates a formal content license (i.e., a third authorization license) according to configuration content (i.e., authorization license configuration information);

3.1, establish a message transmission channel (i.e., message channel) between the IoT terminal device and the IoT management platform;

3.2, the IoT terminal device triggers the use of the encrypted content;

3.3, the IoT terminal device invokes an authorized SDK to load and verify a local license;

3.4.1, the authorized SDK obtains a terminal identification ID (i.e., device identification) and an authentication code;

3.4.2, the authorized SDK generates device authorization request data (i.e., an authorization request message);

3.4.3, the authorized SDK sends the device authorization request data uplink to the IoT management platform;

3.4.4, the IoT management platform sends the device authorization request data to the authorization management service;

3.4.5, the authorization management service performs authorization message authentication and authorization (i.e., verification of the IoT device);

3.4.6, the authorization management service performs device authorization and generates a device authorization license (i.e., a first authorization license);

3.4.7, the authorization management service issues the device authorization license to the authorized SDK through the IoT management platform; and 3.4.8, the authorized SDK performs encryption and storage of the device authorization license, binds the device authorization license to the IoT terminal device, and provides the device authorization license to the IoT terminal device for its use.

Compared with the way by using hardware encryption lock, the technical solutions provided by the embodiments of the present application have the following advantages:

1, various forms of authorization can be provided, such as trial authorization, authorization by time period, and so on;

2, there is no need to add and maintain additional hardware, and the cost is low; and 3, integration is necessary at a software level only, thus leading to applicability to various IoT devices.

Compared with the way by using the software registration code, the technical solutions provided by the embodiments of the present application have the following advantages:

1. real-time automatic activation and authorization accomplished upon network access;

2. lightweight encryption protection realized through $ID^2$ (Internet Device ID, a trusted identity identification of the IoT device), universally applicable to various IoT devices; and 3. automatically judgment and execution without human-computer interaction when the device is used.

Referring to FIG. 2, it shows a flowchart of steps of a method for data processing based on Internet of Things provided by an embodiment of the present application. The method can be applied to an Internet of Things platform.

Specifically, the method may include the steps as follows.

Step 201, receive an authorization request message sent by an Internet of Things device, where the Internet of Things device is deployed with encrypted target content, and the authorization request message carries a device identification and an authentication code of the Internet of Things device.

The target content can be algorithms or codes of related technologies integrated into the Internet of Things device, such as algorithms or codes of speech recognition or image recognition technologies.

The device identification can include a device hardware ID, which is a unique identification solidified in the hardware during the production process and cannot be tampered with or erased.

The authentication code can be one-off authentication data generated based on an authentication key or a device root-of-trust of the Internet of Things device, and every time the authentication code is used for authentication, an authentication code generation is performed. The authentication key or device root-of-trust is data always stored in the IoT device and can be issued onto the device by the Internet of Things platform (when the device is used for a first time) when the Internet of Things device does not have the authentication key/device root-of-trust.

The authentication key or the device root-of-trust can be used to generate the authentication code. For example, the authentication key or the device root-of-trust can be $ID^2$, which is a trusted identity identification of the IoT device and has a security attribute of being untamperable, unforgeable, and globally unique.

When the Internet of Things device triggers the use of the encrypted target content, it is necessary to load and verify an authorization license for the encrypted target content. When an abnormal condition occurs during the loading or verifying process, the Internet of Things device can authorize a preset SDK to automatically trigger an application and updating process of the license, so as to obtain the device identification and the authentication code of the Internet of Things device, and then to generate the authorization request message for the target content according to the device identification and the authentication code of the Internet of Things device and send the authorization request message to the Internet of Things platform. The Internet of Things platform can receive the authorization request message.

It should be noted that when there is no authentication code, the authentication code can be sent as null.

As an example, the abnormal condition occurring during the loading or verifying process includes any of the following:

there is no authorization license for the encrypted target content locally stored on the Internet of Things device (for example, when the Internet of Things device is used for a first time or the local cache of the Internet of Things device is damaged), or an authorization license for the encrypted target content stored locally on the Internet of Things device is invalid (for example, when authorization license time expires).

In an example, when no abnormal condition occurs during the loading or verifying process, that is, there is an authorization license for the encrypted target content locally stored on the Internet of Things device and the authorization license is valid, the decryption can then be performed directly on the encrypted target content based on the locally stored authorization license, and corresponding functions can be executed by using a capability provided by the target content within an authorized and licensed scope of a first authorization license.

In an embodiment of the present application, before receiving the authorization request message sent by the Internet of Things device, the method can further include the following step:

establish a message channel with the Internet of Things device after the Internet of Things device is started.

In order to realize message interaction between the Internet of Things device and the Internet of Things platform, after the Internet of Things device is started, the message channel between the Internet of Things platform and the Internet of Things device can be established.

Step 202, perform verification on the Internet of Things device according to the device identification and the authentication code, and generate a first authorization license for the Internet of Things device after the verification of the Internet of Things device is passed.

After obtaining the device identification and the authentication code, the Internet of Things platform can invoke a preset authorization management service to perform verifying on the Internet of Things device, specifically, can perform verifying through the device identification and the authentication code. The authentication code generated based on the authentication key or the device root-of-trust ($ID^2$) of the Internet of Things device provides a one-machine-one-secret device authentication mechanism.

When the verification performed on the Internet of Things device fails, a direct refusal on the authorization license can be performed, with a verification failure message returned to the Internet of Things device, and with no subsequent operations performed. When the verification performed on the Internet of Things device is passed, the first authorization license for the Internet of Things device can be generated, to perform specific device authorization operations.

In an embodiment of the present application, before generating the first authorization license for the Internet of Things device, the method can further include the following step:

generate a second authorization license for the target content, where the second authorization license includes key information for encrypting the target content; obtain authorization license configuration information, and generate a third authorization license according to the second authorization license and the authorization license configuration information.

The third authorization license includes the second authorization license and the authorization license configuration information.

As an example, the authorization license configuration information may include but is not limited to the following:

information on the number of devices of authorization license, and information on an effective duration of authorization license.

When encryption is performed on the target content, the key information for encrypting the target content can be obtained, and then the second authorization license for the target content can be generated according to the key information.

Since corresponding authorization license configuration can be performed for specific products and needs, the input authorization license configuration information can be received, and then the third authorization license for the target content can be generated according to the second authorization license and the authorization license configuration information. The third authorization license may include the second authorization license and the authorization license configuration information.

In an embodiment of the present application, generating the first authorization license for the Internet of Things device may include the following step:

generate the first authorization license for the Internet of Things device according to the third authorization license.

In practical applications, the second authorization license can be an original license. The third authorization license can be a formal license after the authorization license configuration information is added and can be a template of an authorization license. Thus, the first authorization license for a specific Internet of Things device can be generated on the basis of the third authorization license, and the first authorization license can only be used by the specific Internet of Things device.

In an embodiment of the present application, before generating the second authorization license for the target content, the method can further include the following step:

obtain the target content: perform encryption on the target content, and deploy the encrypted target content to the Internet of Things device.

For target content that requires security assurance and usage management and control, since the target content will be integrated and run in the Internet of Things device, the preset authorization management service can be invoked to encrypt the target content, and then deployed in the Internet of Things device according to the actual scenario.

Step 203, send the first authorization license to the Internet of Things device to enable the Internet of Things device to adopt the first authorization license to decrypt the target content and use decrypted target content.

After the first authorization license is obtained, the first authorization license can be sent to the Internet of Things device. Specifically, the first authorization license can be encrypted using the key of the Internet of Things device and then issued, and then the Internet of Things device can decrypt the encrypted first authorization license after receiving it, to obtain the first authorization license.

After obtaining the first authorization license, the Internet of Things device can decrypt the encrypted target content using the first authorization license and can use the capability provided by the target content within the authorized and licensed scope of the first authorization license to execute corresponding functions.

In an example, after receiving the first authorization license, the Internet of Things device can store the first authorization license locally and can bind the first authorization license to the Internet of Things device. Specifically, the binding can be based on the authentication key or device root-of-trust (ID$^2$) of the Internet of Things device. On the basis of the one-machine-one-secret characteristic of the authentication key or device root-of-trust (ID$^2$) of the Internet of Things device, it is ensured that the locally stored authorization license cannot be copied to other devices for false use, providing high-security protection throughout the entire life cycle of the authorization license.

In the embodiment of the present application, an Internet of Things platform receives an authorization request message sent by an Internet of Things device, where the Internet of Things device is deployed with encrypted target content, and the authorization request message includes a device identification and an authentication code of the Internet of Things device; then the Internet of Things platform performs verification on the Internet of Things device according to the device identification and the authentication code, generates a first authorization license for the Internet of Things device after the verification of the Internet of Things device is passed, and sends the first authorization license to the Internet of Things device to enable the Internet of Things device to adopt the first authorization license to decrypt the target content and use the decrypted target content. In this way, the lightweight authorization management and content protection of the Internet of Things device is realized, not only automatic authorization management can be performed on the Internet of Things device, but also the performance loss of the Internet of Things device and the impact of the network in which the Internet of Things device is located can be reduced through protecting the security of content by encryption means.

Referring to FIG. 3, it shows a flowchart of steps of another method for data processing based on Internet of Things provided by an embodiment of the present application. The method can be applied to an Internet of Things platform.

Specifically, the method may include the steps as follows.

Step 301, obtain target content.

Step 302, perform encryption on the target content to deploy the encrypted target content to an Internet of Things device.

Step 303, generate a second authorization license for the target content, where the second authorization license includes key information for encrypting the target content.

Step 304, obtain authorization license configuration information, and generate a third authorization license based on the second authorization license and the authorization license configuration information, where the third authorization license includes the second authorization license and the authorization license configuration information.

Step 305, establish a message channel with the Internet of Things device after the Internet of Things device is started.

Step 306, receive an authorization request message sent by the Internet of Things device, where the Internet of Things device is deployed with the encrypted target content, and the authorization request message includes a device identification and an authentication code of the Internet of Things device.

Step 307, perform verification on the Internet of Things device according to the device identification and the authentication code, and generate a first authorization license for the Internet of Things device after the verification of the Internet of Things device is passed;

Step 308, send the first authorization license to the Internet of Things device to enable the Internet of Things device to adopt the first authorization license to decrypt the target content and use the decrypted target content.

Referring to FIG. 4, it shows a flowchart of steps of another method for data processing based on Internet of Things provided by an embodiment of the present application. The method can be applied to an Internet of Things device, and the Internet of Things device is deployed with encrypted target content.

Specifically, the method may include the steps as follows.

Step 401, send an authorization request message to an Internet of Things platform when a use of the encrypted target content is triggered, where the authorization request message carries a device identification and an authentication code of the Internet of Things device.

The authentication code is one-off authentication data generated based on an authentication key or a device root-of-trust of the Internet of Things device, and the Internet of Things device performs an authentication code generation every time the Internet of Things device uses the authentication code for authentication.

An abnormal condition occurring during a loading or verifying process includes any of the following:

there is no authorization license for the encrypted target content locally stored on the Internet of Things device, or an authorization license for the encrypted target content stored locally on the Internet of Things device is invalid.

In an embodiment of the present application, sending the authorization request message to the Internet of Things platform when the use of the encrypted target content is triggered may include:

loading and verifying an authorization license for the encrypted target content when the use of the encrypted target content is triggered, and sending the authorization request message to the Internet of Things platform when an abnormal condition occurs during the loading or verifying process.

Step 402, receive a first authorization license sent by the Internet of Things platform, and adopt the first authorization license to decrypt the target content and use the decrypted target content, where the first authorization license is generated for the Internet of Things device after the Internet of Things platform performs verification on the Internet of Things device according to the device identification and the authorization code and the verification of the Internet of Things device is passed.

In an embodiment of the present application, the method may include the following step:

store the first authorization license locally and bind the first authorization license to the Internet of Things device.

It should be noted that for describing the method embodiments simply, they are expressed as a series of action combinations. However, those skilled in the art should know that the embodiments of the present application are not limited by the described action sequence since certain steps may be performed in other orders or simultaneously according to the embodiments of the present application. Secondly, those skilled in the art should also know that the embodiments described in the specification are all preferred embodiments, and the actions involved may not be necessary for the embodiments of the present application.

Referring to FIG. 5, it shows a schematic structural diagram of an apparatus for data processing based on Internet of Things provided by an embodiment of the present application. The apparatus can be applied to an Internet of Things platform.

Specifically, the apparatus can include the following modules:

an authorization request message receiving module 501, configured to receive an authorization request message sent by an Internet of Things device, where the Internet of Things device is deployed with encrypted target content, and the authorization request message carries a device identification and an authentication code of the Internet of Things device;

a first authorization license generating module 502, configured to perform verification on the Internet of Things device according to the device identification and the authentication code, and generate a first authorization license for the Internet of Things device after the verification of the Internet of Things device is passed;

a first authorization license sending module 503, configured to send the first authorization license to the Internet of Things device to enable the Internet of Things device to adopt the first authorization license to decrypt the target content and use the decrypted target content.

In an embodiment of the present application, the apparatus may further include:

a second authorization license generating module, configured to generate a second authorization license for the target content, where the second authorization license includes key information for encrypting the target content;

a third authorization license generating module, configured to obtain authorization license configuration information, and generate a third authorization license based on the second authorization license and the authorization license configuration information, where the third authorization license includes the second authorization license and the authorization license configuration information.

The first authorization license generating module 502 may include:

a third license-based first license generating submodule, configured to generate the first authorization license for the Internet of Things device according to the third authorization license.

In an embodiment of the present application, the apparatus may further include:

a target content obtaining module, configured to obtain target content;

a target content encrypting module, configured to perform encryption on the target content, and deploy the encrypted target content to the Internet of Things device.

In an embodiment of the present application, the authorization license configuration information may include but is not limited to the following:

information on the number of devices of authorization license, and information on an effective duration of authorization license.

In an embodiment of the present application, the apparatus may further include:

a message channel establishing module, configured to establish a message channel with the Internet of Things device after the Internet of Things device is started.

In an embodiment of the present application, the authentication code is one-off authentication data generated based on an authentication key or a device root-of-trust of the Internet of Things device and the Internet of Things device performs an authentication code generation every time the Internet of Things device uses the authentication code for authentication.

Referring to FIG. 6, it shows a schematic structural diagram of an apparatus for data processing based on Internet of Things provided by an embodiment of the present application. The apparatus can be applied to an Internet of Things device, and the Internet of Things device is deployed with encrypted target content.

Specifically, the apparatus may include the following modules:

an authorization request message sending module 601, configured to send an authorization request message to an Internet of Things platform when a use of the encrypted target content is triggered, where the authorization request message includes a device identification and an authentication code of the Internet of Things device;

a first authorization license receiving module 602, configured to receive a first authorization license sent by the Internet of Things platform, and adopt the first authorization license to decrypt the target content and use the decrypted target content, where the first authorization license is generated for the Internet of Things device after the Internet of Things platform performs verification on the Internet of Things device according to the device identification and the authorization code and the verification of the Internet of Things device is passed.

In an embodiment of the present application, the apparatus may further include:

a storing and binding module, configured to store the first authorization license locally and bind the first authorization license to the Internet of Things device.

In an embodiment of the present application, an abnormal condition occurring during a loading or verifying process includes any of the following:

there is no authorization license for the encrypted target content locally stored on the Internet of Things device, or an authorization license for the encrypted target content stored locally on the Internet of Things device is invalid.

In an embodiment of the present application, the authorization request message sending module 601 may include:

an anomaly detection submodule, configured to load and verify an authorization license for the encrypted target content when the use of the encrypted target content is triggered, and send the authorization request message to the Internet of Things platform when an abnormal condition occurs during the loading or verifying process.

In an embodiment of the present application, the authentication code is one-off authentication data generated based on an authentication key or a device root-of-trust of the Internet of Things device, and the Internet of Things device performs an authentication code generation every time the Internet of Things device uses the authentication code for authentication.

An embodiment of the present application further provides an electronic device, which may include a processor, a memory, and a computer program stored in the memory and capable of running on the processor. When the computer program is executed by the processor, the method for data processing based on Internet of Things mentioned above is implemented.

An embodiment of the present application further provides a computer-readable storage medium, on which a computer program is stored, and when the computer program is executed by a processor, the method for data processing based on Internet of Things mentioned above is implemented.

As for the apparatus embodiments, since they are basically similar to the method embodiments, the description thereof is relatively simple, and reference for the relevant details of which can be made to the partial description of the method embodiments.

Each embodiment in this specification is described in a progressive manner. Each embodiment focuses on the differences from other embodiments, and reference for the same or similar parts between the various embodiments can be made to each other.

Those skilled in the art should understand that the embodiments of the present application may be provided as methods, apparatuses, or computer program products. Thus, the embodiments of the present application may take the form of an entire hardware embodiment, an entire software embodiment, or an embodiment that combines software and hardware aspects. Furthermore, embodiments of the present application can take the form of a computer program product embodied on one or more computer-usable storage media (including but not limited to disk storage, CD-ROM, optical storage, etc.) containing computer-usable program codes.

The embodiments of the present application are described with reference to flowcharts and/or block diagrams of methods, terminal devices (systems), and computer program products according to the embodiments of the present application. It will be understood that each procedure and/or block in the flowcharts and/or block diagrams, and combinations of procedures and/or blocks in the flowcharts and/or block diagrams can be implemented by computer program instructions. These computer program instructions can be provided to a processor of a general-purpose computer, a special-purpose computer, an embedded processor, or other programmable data processing terminal devices to produce a machine, such that the instructions executed by the processor of the computer or other programmable data processing terminal devices produce means for implementing the functions specified in one or more procedures of the flowcharts and/or one or more blocks of the block diagrams.

These computer program instructions may also be stored in a computer-readable memory that causes a computer or other programmable data processing terminal equipment to operate in a particular manner, such that the instructions stored in the computer-readable memory produce an article of manufacture including the instruction means. The instruction means implements the functions specified in a process or processes of the flowchart and/or a block or blocks of the block diagram.

These computer program instructions can also be loaded onto a computer or other programmable data processing terminal equipment, so that a series of operating steps are performed on the computer or other programmable terminal equipment to produce computer-implemented processing, thereby causing the computer or other programmable terminal equipment to perform a computer-implemented process. The instructions executed on the computer or other programmable terminal equipment provide steps for implementing the functions specified in a process or processes of the flow diagrams and/or a block or blocks of the block diagrams.

Although preferred embodiments of the embodiments of the present application have been described, those skilled in the art will be able to make additional changes and modifications to these embodiments once the basic inventive concepts are learned. Therefore, it is intended that the appended claims be construed to include the preferred embodiments and all changes and modifications that fall within the scope of embodiments of the present application.

Finally, it should be noted that in this document, relational terms such as first and second are only used to distinguish an entity or operation from another entity or operation, and do not necessarily require or imply that there are such actual relationships or orders between these entities or operations. Furthermore, the terms "including," "comprising," or any other variation thereof are intended to cover a non-exclusive inclusion such that a process, method, article, or terminal device that includes a list of elements includes not only those elements but also other elements not expressly listed or elements inherent to such process, method, article or terminal device. Without more restrictions, the element defined by the phrase "includes a/an . . . " does not exclude that there are other identical elements in the process, method, article or terminal device including the element.

The method and the apparatus for data processing based on the Internet of Things provided are introduced in detail above. This document uses specific examples to illustrate the principles and implementations of the present application. The description of the embodiments mentioned above is only intended for helping understand the method of the present application and its core idea. Also, for those of ordinary skill in the art, there will be changes in the specific implementation and application scope based on the idea of the present application. In summary, the contents of this specification should not be understood as a limitation of the present application.

What is claimed is:

1. A method for data processing based on Internet of Things, applied to an Internet of Things platform, comprising:

receiving an authorization request message sent by an Internet of Things device, wherein the Internet of Things device is deployed with encrypted target content, and the authorization request message carries a device identification and an authentication code of the Internet of Things device;

performing verification on the Internet of Things device according to the device identification and the authentication code, and generating a first authorization license specific to the Internet of Things device after the verification of the Internet of Things device is passed; and sending the first authorization license to the Internet of Things device to enable the Internet of Things device to adopt the first authorization license to decrypt the encrypted target content and use decrypted target content.

2. The method according to claim 1, before generating the first authorization license specific to the Internet of Things device, further comprising:

generating a second authorization license for original target content, wherein the second authorization license comprises key information for encrypting the original target content; and obtaining authorization license configuration information, and generating a third authorization license based on the second authorization license and the authorization license configuration information; wherein the third authorization license comprises the second authorization license and the authorization license configuration information;

wherein the generating the first authorization license specific to the Internet of Things device comprises:

generating the first authorization license specific to the Internet of Things device according to the third authorization license.

3. The method according to claim 2, before generating the second authorization license for the original target content, further comprising:

obtaining the original target content; and performing encryption on the original target content, and deploying the encrypted target content to the Internet of Things device.

4. The method according to claim 2, wherein the authorization license configuration information comprises:

information on a number of devices of authorization license, and information on an effective duration of authorization license.

5. The method according to claim 1, before receiving the authorization request message sent by the Internet of Things device, further comprising:

establishing a message channel with the Internet of Things device after the Internet of Things device is started.

6. The method according to claim 1, wherein the authentication code is one-off authentication data generated based on an authentication key or a device root-of-trust of the Internet of Things device, and the Internet of Things device performs an authentication code generation every time the Internet of Things device uses the authentication code for authentication.

7. A method for data processing based on Internet of Things, applied to an Internet of Things device, wherein the Internet of Things device is deployed with encrypted target content, and the method comprises:

sending an authorization request message to an Internet of Things platform when a use of the encrypted target content is triggered, wherein the authorization request message carries a device identification and an authentication code of the Internet of Things device; and receiving a first authorization license sent by the Internet of Things platform, and adopting the first authorization license to decrypt the encrypted target content and use decrypted target content; wherein the first authorization license is generated specific to the Internet of Things device after the Internet of Things platform performs verification on the Internet of Things device according to the device identification and the authentication code and the verification of the Internet of Things device is passed.

8. The method according to claim 7, further comprising:

storing the first authorization license locally and binding the first authorization license to the Internet of Things device.

9. The method of claim 7, wherein the sending the authorization request message to the Internet of Things platform when the use of the encrypted target content is triggered comprises:

loading and verifying an authorization license for the encrypted target content when the use of the encrypted target content is triggered, and sending the authorization request message to the Internet of Things platform when an abnormal condition occurs during the loading or verifying process, wherein an abnormal condition occurring during the loading or verifying process comprises any of the following:

there is no authorization license for the encrypted target content locally stored on the Internet of Things device, or an authorization license for the encrypted target content stored locally on the Internet of Things device is invalid.

10. The method according to claim 7, wherein the authentication code is one-off authentication data generated based on an authentication key or a device root-of-trust of the Internet of Things device, and the Internet of Things device performs an authentication code generation every time the Internet of Things device uses the authentication code for authentication.

11. An apparatus for data processing based on Internet of Things, applied to an Internet of Things platform, comprising:

a processor and a memory stored with computer program instructions capable of running on the processor; wherein when the computer program instructions are executed by the processor, the processor is enabled to:

receive an authorization request message sent by an Internet of Things device, wherein the Internet of Things device is deployed with encrypted target content, and the authorization request message carries a device identification and an authentication code of the Internet of Things device;

perform verification on the Internet of Things device according to the device identification and the authentication code, and generate a first authorization license specific to the Internet of Things device after the verification of the Internet of Things device is passed; and send the first authorization license to the Internet of Things device to enable the Internet of Things device to adopt the first authorization license to decrypt the encrypted target content and use decrypted target content.

12. An apparatus for data processing based on Internet of Things, applied to an Internet of Things device, wherein the Internet of Things device is deployed with encrypted target content, and the apparatus comprises:

a processor; and a memory stored with computer program instructions capable of running on the processor; wherein when the computer program instructions are executed by the processor, the processor is enabled to perform the method according to claim 7.

13. The apparatus according to claim 11, wherein when the computer program instructions are executed by the processor, the processor is further enabled to:

generate a second authorization license for original target content, wherein the second authorization license comprises key information for encrypting the original target content;

obtain authorization license configuration information, and generating a third authorization license based on the second authorization license and the authorization license configuration information; wherein the third authorization license comprises the second authorization license and the authorization license configuration information; and generate the first authorization license specific to the Internet of Things device according to the third authorization license.

14. The apparatus according to claim 13, wherein when the computer program instructions are executed by the processor, the processor is further enabled to:

obtain the original target content; and perform encryption on the original target content, and deploy the encrypted target content to the Internet of Things device.

15. The apparatus according to claim 13, wherein the authorization license configuration information comprises:

information on a number of devices of authorization license, and information on an effective duration of authorization license.

16. The apparatus according to claim 11, before receiving the authorization request message sent by the Internet of Things device, further comprising:

establish a message channel with the Internet of Things device after the Internet of Things device is started.

17. The apparatus according to claim 11, wherein the authentication code is one-off authentication data generated based on an authentication key or a device root-of-trust of the Internet of Things device, and the Internet of Things device performs an authentication code generation every time the Internet of Things device uses the authentication code for authentication.

18. The apparatus according to claim 12, wherein when the computer program instructions are executed by the processor, the processor is further enabled to:

store the first authorization license locally and bind the first authorization license to the Internet of Things device.

19. The apparatus according to claim 12, wherein when the computer program instructions are executed by the processor, the processor is further enabled to:

load and verify an authorization license for the encrypted target content when the use of the encrypted target content is triggered, and send the authorization request message to the Internet of Things platform when an abnormal condition occurs during the loading or verifying process, wherein an abnormal condition occurring during the loading or verifying process comprises any of the following:

there is no authorization license for the encrypted target content locally stored on the Internet of Things device, or an authorization license for the encrypted target content stored locally on the Internet of Things device is invalid.

20. The apparatus according to claim 12, wherein wherein the first authorization license specific to the Internet of Things device is generated according to a third authorization license;

wherein the third authorization license is generated by the Internet of Things platform according to a second authorization license and authorization license configuration information, wherein the third authorization license comprises the second authorization license and the authorization license configuration information;

wherein the second authorization license is generated, by the Internet of Things platform, for original target content, wherein the second authorization license comprises key information for encrypting the original target content.

* * * * *